United States Patent [19]

Zachariadis

[11] 4,387,450
[45] Jun. 7, 1983

[54] EXPENDABLE SEAFLOOR SENSOR EXPLORATION SYSTEM

[75] Inventor: Robert G. Zachariadis, Dallas, Tex.

[73] Assignee: Mobil Oil Corporation, N.Y.

[21] Appl. No.: 221,734

[22] Filed: Dec. 31, 1980

[51] Int. Cl.³ .............................................. G01V 1/38
[52] U.S. Cl. ..................................... 367/20; 367/130
[58] Field of Search ...................... 367/4, 19, 20, 106, 367/130, 173, 15, 16, 17, 18

[56] References Cited

U.S. PATENT DOCUMENTS

| | | | |
|---|---|---|---|
| 3,174,128 | 3/1965 | Dow et al. | 367/106 |
| 3,496,525 | 2/1970 | Francis | 367/106 X |
| 3,831,136 | 8/1974 | Sagoci | 367/19 |
| 4,189,703 | 2/1980 | Bennett | 367/130 X |
| 4,193,057 | 3/1980 | Bennett et al. | 367/4 X |
| 4,272,835 | 6/1981 | Flood et al. | 367/4 |

OTHER PUBLICATIONS

Laing et al., IEEE Trans. on Sonics and Ultrasonics, vol. SU-12, No. 2, Jun. 1965, pp. 26-30.
Edo Western Corp. Brochure, "Model 515A HiPact Bottom Penetration System", front & rear cover and p. 13.
Sippican Corp. Oceanographic Systems Div., "Expendable Wire Links", XWL for Underwater Data Transmission, Jun., 1973.
Sippican Corp. Horizon, vol. 3, No. 1, 1978, pp. 1-6.

Primary Examiner—Richard A. Farley
Attorney, Agent, or Firm—Charles A. Huggett; Michael C. Gilman; George W. Hager

[57] ABSTRACT

Marine seismic data is gathered by a single vessel beyond the range of a conventional towed seismic sensor cable through the use of expendable sensors and hard wire transmission cables. The vessel tows a submerged platform adapted to carry several inexpensive seismic sensors and very small diameter multiconductor cables which are controllably released from the platform by appropriate equipment on the towing vessel. Signals generated by each sensor are transmitted back to the towed, submerged platform through the small diameter cable connected to each sensor and are transmitted by other means from the platform to the towing vessel for retransmission, recording and/or display. Each sensor transmits a signal back to the platform until its small diameter cable is completely deployed at which time the cable breaks and is abandoned together with the sensor. Very small diameter marine cables, which are commercially available in lengths of 20,000 feet and more are envisioned to be used to practice the invention, are coupled with an inexpensive hydrophone and preamplifier to allow the generation and reception of wide angle reflection and short range refraction seismic signals by a single vessel.

8 Claims, 5 Drawing Figures

EXPENDABLE SEAFLOOR SENSOR EXPLORATION SYSTEM

This invention relates to the exploration of submerged areas and in particular to a method and apparatus for gathering marine seismic data beyond the range of conventionally towed cables, the apparatus including expendable seafloor sensors and hard wire data transmission links.

In the seismic surveying of submerged geophysical formations for gas and petroleum deposits, it is often desirable to gather wide angle reflection and refraction data to complement the normal reflection data which typically constitutes the bulk of the information obtained. Gathering this data requires a greater separation of seismic wave sources and detectors than can be achieved with the towed seismic wave sources and seismic sensor cables commonly used to gather normal reflection data.

Expendable sonobuoys are typically used to gather wide angle reflection and/or refraction data. By deploying sonobuoys, a single survey vessel can gather wide angle reflection and/or refraction data while simultaneously gathering normal reflection data using a conventional, towed sensor cable. However, commercially available sonobuoys are neither reusable nor inexpensive, typically costing nearly one thousand dollars each. Also, sonobuoys will drift from their originally deployed location under the influence of wind and water currents thus degrading the positional accuracy of their gathered data.

It would be desirable to have an expendable apparatus less expensive than a sonobuoy for gathering wide angle reflection and refraction data. A significant aspect of the cost of the sonobuoy is a radio transmitter incorporated into the device for data transmission.

The Sippican Corporation of Marion, Massachusetts manufactures extremely thin marine cables for voice and data transmission. The cost of such cables is considerably less than conventional marine cables and, when coupled with an inexpensive seismic sensor package, is still significantly less than the current cost of sonobuoys. Sippican supplies its cables on spools in varying lengths from approximately 5,000 to 60,000 feet. The Sippican cables were originally developed for use with an expendable bathythermograph. Among the uses which Sippican has itself proposed for its thin cables are remote sensor monitoring, remote in-situ sensor monitoring, and seismic array monitoring.

The Sippican expendable wire link as presently produced is insufficiently insulated to have essentially unvarying capacitance with respect to its opening environment. Consequently, changing the proportion of a given length of the link in air and in water causes a continuous changing frequency response in the link. Such a characteristic is undesirable in data transmission applications such as seismic surveying where signal frequency is a significant aspect of the transmitted data.

SUMMARY OF THE INVENTION

It is a first object of the invention to provide a method for gathering marine seismic data by a surface vessel using a wire communication link whose variation in capacitance with length deployed is minimized by fully immersing the link in water.

It is also an object of the invention to provide apparatus useful for gathering wide angle reflection and/or refraction data.

It is yet another object of the invention to provide an inexpensive seafloor seismic sensor system which can be operated by a single vessel and abandoned after use.

It is yet another object of the invention to provide a system which allows for the accurate positioning of a sensor on the seafloor by a moving surface vessel.

According to the invention, the aforesaid objects and other beneficial results are accomplished by gathering marine seismic data and especially wide angle reflection and short range refraction data from a research vessel beyond the range of its conventional towed seismic cables through inexpensive, expendable, thin wire data transmission cables and seismic sensors positioned on the seafloor. Each sensor consists of a suitable transducer, such as an inexpensive hydrophone or geophone, and related components housed in a suitable container for generating and transmitting a trace data signal. A towed underwater platform is adapted to carry and controllably release a plurality of sensors and thin wire transmission cables. A portion of each thin wire transmission cable is stored in a reservoir in the sensor and is automatically dispensed as the sensor drops to the seafloor upon being released. A second reservoir in the towed platform contains the remainder of the thin wire transmission cable which is automatically dispensed as the platform is towed away from the sensor release point. The thin wire transmission cable is suitably housed within this platform and sensor so as to be fully immersed in sea water during operation. The sensor will transmit seismic data through the thin wire transmission cable to the platform until the thin wire cable is fully dispensed from the platform reservoir at which time the cable will break. Suitable circuitry between the towable platform and the towing vessel supplies power and control signals to equipment in the platform and carries the signals transmitted by the sensors over the thin wire transmission cables to equipment on the towing vessel for recording, retransmission and/or display. Thin wire cables suitable for transmitting seismic data in the lower seismic frequencies are available in lengths of 20,000 feet or more and allow the gathering of seismic data by a towing exploration vessel from the deployed sensors located up to approximately four or more miles away.

DESCRIPTION OF THE PREFERRED EMBODIMENT

Figure 1:
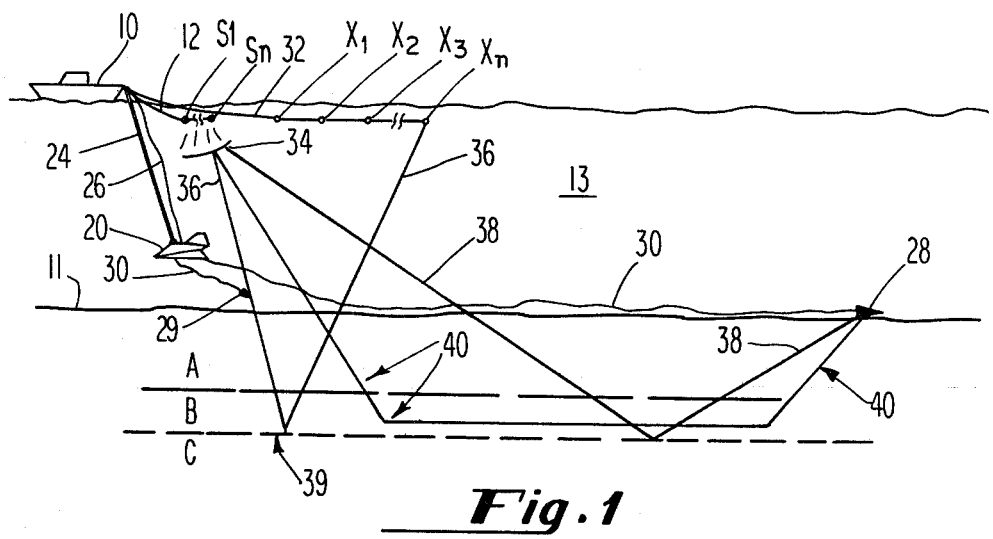
FIG. 1 depicts a marine seismic exploration system for practicing the present invention.

FIG. 1 illustrates a marine seismic survey system for practicing the present invention. A surface vessel 10 traverses an area of the seafloor 11 to be surveyed. The vessel is provided with suitable means for generating seismic waves, such as, for example, one or more seismic wave generators S1-Sn which are towed behind the vessel 10 through the water 13 by appropriate means such as a suitable cable 12. Also towed behind the vessel 10 and beneath the seismic generators S1-Sn is a towable submarine platform such as a "fish" 20. The fish 20 is a hollow shell, typically of fiberglass, designed and constructed so as to follow the towing vessel 10 in a straight line almost directly below and behind the vessel without rotation or uncontrolled lateral movement. Such devices are obtainable from several commercial sources including, for example, the EDO Western Corporation of Salt Lake City, Utah. A cable 24 is provided between the fish 20 and vessel 10 for towing. A second, multiconductor electrical cable 26 is also provided between the vessel 10 and fish 20 to supply power to various apparatus in the fish and to transmit various signals between the fish 20 and vessel 10. If desired, a single cable providing the functions of towing and electrical connection may be used.

As the vessel 10 makes its traverse of the area to be seismic surveyed, expendable seismic sensors 28 and 29 are controllably released from the fish 20. Each released sensor trails a small diameter, multiconductor, data transmission cable or "thin wire link" 30 from an internal reservoir. The link 30 also plays out from a second reservoir in the fish 20 as it is being towed away. It is envisioned that the use of a single reservoir located in the fish 20 will also be sufficient for certain thin wire links 30. If desired, the vessel 10 may also tow above the fish 20 a conventional seismic cable 32 containing a multiplicity of acoustic receivers $X_1$-$X_n$ for normal reflection survey during the traverse.

The seismic wave generators S1-Sn are controlled by appropriate equipment in the vessel 10 and are activated periodically to produce a seismic wave having a front 34 which propagates through the water, the surface of the seafloor 11 and the underlying subsurface geophysical formations which, for purposes of illustration, consists of layers A, B and C. Portions of the propagating seismic wave are reflected by the subsurface formation interfaces and return to the seafloor surface 11 and sea 13 where they are detected by the expendable sensors 28 and 29 and acoustic receivers $X_1$-$X_n$. Pairs of lines 36 and 38 illustrate typical paths followed by portions of the wave energy incident upon and reflected from the interface 39 between the layers B and C to the acoustic receiver $X_n$ and the sensor 29, respectively. Each sensor 28 and 29 generates a signal which indicates the passage of the reflected, returning seismic wave. The signal is transmitted by the thin wire link 30 back to the fish 20 and from the fish 20 through the electrical cable 26 to the vessel 10 for recording, retransmission and/or display by appropriate equipment. Because the thin wire link 30 is sufficiently long to allow the sensors 28 and 29 to be positioned more remotely from the seismic sources S1-Sn than are the towed acoustical receivers $X_1$-$X_n$, those sensors which are more remotely positioned, as is the sensor 29, are able to detect seismic waves reflected at greater angles from the vertical than can the acoustic receivers Xi, as is illustrated in FIG. 1. The more remotely deployed sensor 29 is also more likely to receive refracted seismic wave returns than are the receivers $X_1$-$X_n$ in the towed cable 12. An example of a path taken by a refracted wave and sensed by the sensor 29 is indicated by the lines 40. It is expected that each deployed sensor 28 and 29 will continue to transmit data until its thin wire data link 30 is fully deployed from the reservoir in the fish 20 at which time the link 30 will break. The links 30 and sensors 28 and 29 are then abandoned.

As will be subsequently described, each sensor is suitably weighted so as to sink rapidly to the seafloor when released. It is envisioned that the fish 20 will be towed at a relatively slow speed over the seafloor 11 while releasing the sensors. It is suggested that the fish 20 be towed near the seafloor 11 so as to more accurately estimate the position of each released sensor. For example, it is envisioned that towing the fish within 100 feet or less of the seafloor at a speed less than five knots will result in the sensor being positioned much less than 100 feet and perhaps as little as 10 feet laterally removed from its release point, a sufficient accuracy for the wide angle reflection and short range refraction survey to be conducted with the system and considerably more accuracy than is generally achieved with drifting sonobuoys. The fish 20 can be maintained close to the seafloor in areas which do not vary significantly in depth by initially selecting a suitable length of towing cable 24. If the depth of the seafloor to be traversed varies significantly or unpredictably, a suitable hoist apparatus may be required on the towing vessel 10 to vary the length of the towing cable 24 and thus depth of the fish 20 so as to maintain a desired height above the seafloor. As will be later described, auxiliary equipment such as a sonar transducer or depth detector may be installed in the fish 20 to interact with equipment in the vessel 10 to assist in locating the position of the fish 20 with respect to the vessel 10 and the seafloor 11, respectively. It is of course possible to tow the fish at a height much greater than 100 feet from the seafloor in such areas when releasing sensors so as to simplify the hoist apparatus required. Accuracy of the estimated location of the sensor on the seafloor will be degraded but still should be sufficiently adequate under most circumstances for the survey work envisioned.

Figure 2:
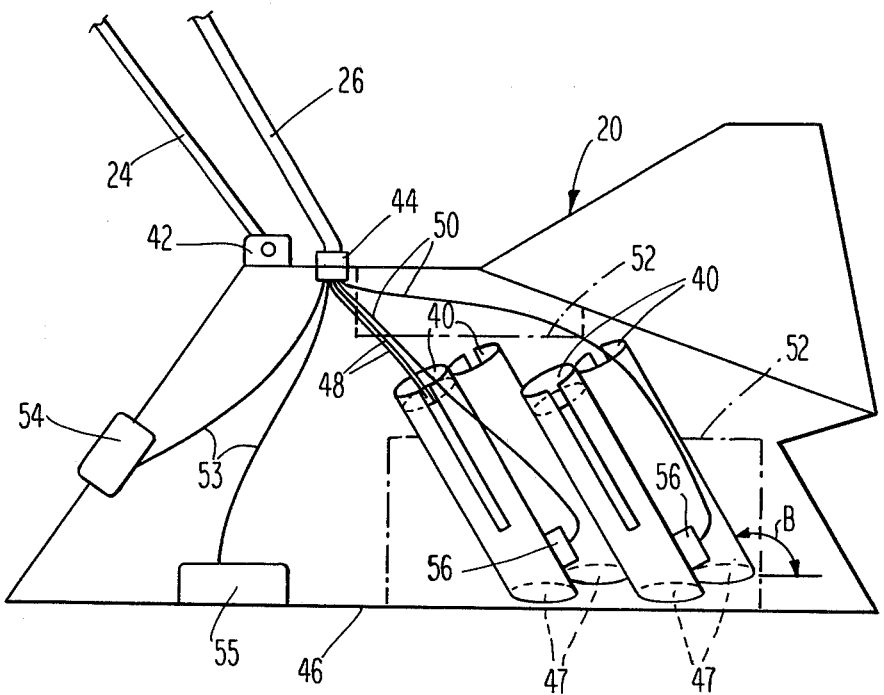
FIG. 2 is a partially sectioned diagrammatic side view of a towable submarine platform adapted to carrying a plurality of releasable sensors and other equipment.

FIG. 2 is a partially sectioned diagrammatic side view of the fish 20 of FIG. 1 disclosing several of its internal and external components. A suitable tow fitting 42 is provided at the forward end of the fish 20 for receiving the towing cable 24. A suitable electrical connector, such as a waterproof multipin connection plug 44 is provided in the outer skin of the fish 20 to receive the proximal end of the multiconductor electrical cable 26 and to provide a plurality of waterproof electrical connection points within the fish 20. The fish is fitted with a plurality of suitable means for transporting and controllably releasing the expendable seismic sensors and their thin wire links. In the example shown, a plurality of hollow tubes 40, essentially cylindrical in shape, are provided for carrying and releasing the sensors and links. Each tube 40 extends in an upward and forward direction from the lower surface 46 into the body of the fish 20 and imparts an essentially vertically downward direction to its sensor when released. Openings 47 are provided in the lower surface 46 of the fish 20, beneath the lower end of each tube 40, as a suitable egress for the contained sensor and thin wire link. Canting the tops of the tubes 40 in a forward direction in the fish 20 also lessens the sharpness of the angle B between the outer lower rear surface of each tube 40 and the lower surface 46 of the fish 20 thus reducing the strain placed upon the thin wire link which is dispensed down the tube 40 and out behind the fish 20. It should also be appreciated that a suitable radius of curvature is provided at the connection between the lower end of each tube 40 and lower surface 46 of the fish so as to avoid forming a sharp edge over which the link 30 would pass while being dispensed. Thus, for example, a radius of curvature is formed at the apex of the angle B. Suitably insulated and waterproofed cables 48 are provided between each tube 40 and the multipin plug 44 and connect the conductor ends of the thin wire link in each tube 40 to jacketed lines in the multiconductor cable 26 for transmission of the sensor generated signals to appropriate recording, retransmission and/or display equipment in the towing vessel 10. Cables 50 are also provided between the multipin plug 44 and a suitable electrical or electromechanical means 52 associated with each tube 40 for releasing its sensor on command from the vessel 10.

Knowing the velocity at which the fish 20 is being towed and the length and angle of the towing cable 24 the position of the fish 20 with respect to the towing vessel can be estimated with reasonable accuracy. If desired, a ranging device 54 such as a sonar transmitter or transducer may be provided in the fish 20 to cooperate with sonar transmitting and/or receiving equipment on the towing vessel 10 to better locate the fish beneath the vessel. An altitude tracker 55 or other comparable device may also be installed in the fish 20, if desired, to locate the height of the fish 20 above the seafloor 11. Suitable electrical connections with the vessel 10 to provide power or control signals to, or to receive signals from any of the devices in the fish 20, including the ranging device 54 and altitude tracker 55, are furnished by the multiconductor cable 26, multipin plug 44 and insulated and waterproofed cables 53 from the plug 44. The fish 20 is also fitted with suitable means such as removable panels 52 (depicted in phantom) which allow access to its interior for servicing components and refitting the tubes 40 with sensors and links.

Figure 3:
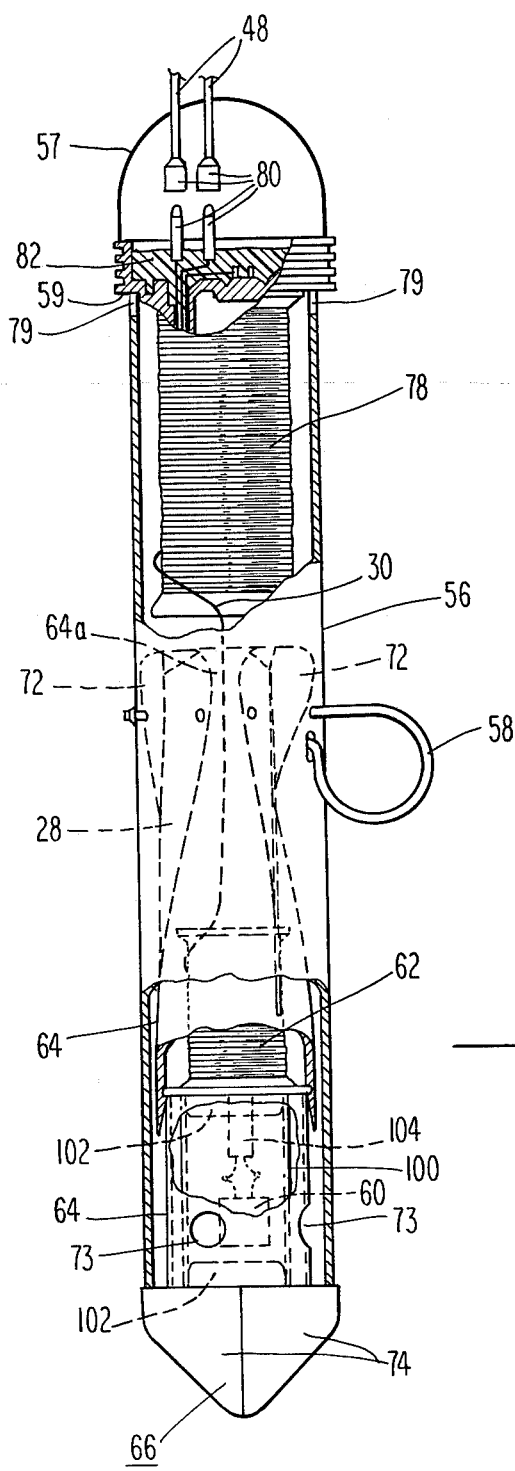
FIG. 3 is a partially sectioned view of a releasable sensor and stored thin wire data transmission line housed in a partially sectioned container.

It is desirable to provide a means for conveniently storing and/or loading a sensor and its thin wire link 30 into the means provided in the fish 20 for their transport and release. A variety of devices are suitable for this purpose. One such device, a cartridge 56, is depicted in FIG. 3. The cartridge 56 in FIG. 3 has been partially sectioned to reveal its expendable sensor 28 and thin wire link 30. The cartridge 56 provides a convenient means of storing the sensor 28 and thin wire link 30 in the vessel prior to installation in a fish and simplifies the installation and removal processes. It is intended that the cartridge 56 be loaded into the top of a tube 40 within the fish 20 like a shell into a breach. The cartridge 56 is essentially cylindrical in shape and formed from a durable material such as plastic to resist deterioration during storage and use in a salt water environment. A removable retaining pin 58 or other suitable means is provided to maintain the sensor 28 in the cartridge 56 prior to the latter's insertion into a tube 40. Suitable means are also provided to prevent the cartridge 56 from dropping completely through the tube 40 after its sensor 28 is released. For example, the cartridge 56 has been provided with an outwardly protruding annular lip 59 at its upper end which interacts with inwardly protruding surface or surfaces in the sidewalls of tube 40 (see FIG. 5) to prevent the cartridge 56 from dropping lower in the tube 40. The cartridge 56 may also be provided with a strap 57 at its upper end or other means suitable to aid in its insertion and removal from the tube 40.

The sensor 28 comprises a shell 64 which is fitted with a weighted nose 66 and houses an instrument package 60 and first spool 62 containing a length of the thin wire link 30. The shell 64 is preferably formed in a ballistic or other suitably streamlined shape from a suitable material such as a plastic as inexpensively as possible and is designed to protect the instrument package 60 and first spool 62 containing a portion of the thin wire link 30. The streamlined shape of the shell 64 and weighted nose 66, which is attached to the shell 64 by any suitable means, causes the sensor 28 to fall rapidly and directly to the seafloor, thus minimizing its lateral travel after release under the effect of currents in the water column. It is suggested that means be provided to prevent the sensor 28 from rolling across the seafloor under the action of bottom currents or when landing on an inclined surface. For example, it is envisioned that the sensor can be made sufficiently stable by providing it with tail fins 72 and a weighted nose 66 having a plurality of essentially flat, outer side surfaces 74 which are disposed radially from the central axis of the sensor 28 farther than the other remaining side walls of the shell 64.

Figure 4:
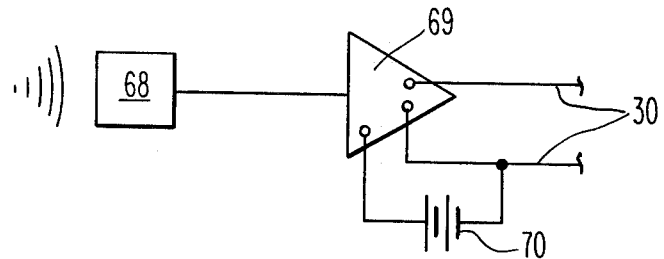
FIG. 4 is a diagrammatic view of an instrument package.

The instrument package 60 can be housed in a variety of ways. In the sensor 28 depicted in FIG. 3, the instrument package 60 is located in a hollow section of the shell 64 between its nose 66 and first thin wire link spool 62. The instrument package comprises an inexpensive seismic transducer such as a hydrophone or gimballed geophone and other components for generating and transmitting a seismic data signal through the thin wire link 30 and electrical cable 26 to the vessel 10. The data signal provides information pertinent to seismic waves detected by the sensor. One suitable instrument package is depicted diagrammatically in FIG. 4 and comprises an inexpensive hydrophone 68, such as a Benthos Corp. Aquadyne AQ17M, the output of which is fed into and used to fluctuate a first voltage generated by a suitable low current drain preamplifier 69. The first fluctuating voltage is outputted from the preamplifier 69 onto one conductor of a multiconductor thin wire link 30. A second conductor of the thin wire link acts as a ground bus for the instrument package. A suitable power supply 70 such as an ordinary nine volt transistor battery is provided to power the preamplifier 69.

Referring again to FIG. 3, the components of the instrument package 60 must be sufficiently protected from the saltwater environment to assure their operation. This can be accomplished in any number of ways. Because it is a goal to limit the total cost of the expendable sensor, it is suggested that the instrument package components be inserted into plastic tubing 100 filled with a suitable dielectric, vibration conducting oil in a fashion similar to the construction of towed seismic cables. The ends of the tube are covered with plugs or bulkheads 102 similar to those used in the construction of such cables. As the service life of the instrument package is expected to be much shorter than such cables and as this method of construction does not subject the seals to pressure differences, sealing may be accomplished with a suitable waterproof sealant such as Silastic ™ or even a waterproof electrical friction tape. Depending upon the particular method of construction employed with the preamplifier and battery and the operating depth of the sensor, it may be desirable to additionally protect one or both of these devices from excessive hydrostatic pressure by suitable means such as potting. The ends of the conductors of that portion of the thin wire link 30 wound on the first spool 62 are passed by suitable means into the plastic tubing 100 for connection with the instrument package 60. For example, Sippican provides shells 64 in which the ends of its thin wire link 30 are passed through a stalk 104 into the instrument package area for connection. The stalk 104 may be passed into the tubing 100 containing the instrument components by coring a plug 102, inserting the cored plug 102 over and sealing it to the stalk 104, thus providing one bulkhead for the plastic tube 100. The components of the instrument package 60 are further protected by the outer side walls of the shell 64 which are provided with holes 73 at various locations to admit sea water into the instrument package area and into contact with the tubing 100. The oil in the plastic tube will transmit seismic vibrations from the sea water to the hydrophone 68. If desired, the holes 73 may also be covered with louvers or screening to further protect the instrument package 60 while admitting sea water.

In the example depicted, a continuous length of thin wire data transmission link 30 is divided between the first spool 62 affixed by suitable means in the rear of the sensor shell 64 and a second spool 78 affixed by suitable means to the upper end of the cartridge 56. It is envisioned that the thin wire link 30 comprises a very small diameter cable having a plurality of extremely thin conductors coated with insulating, waterproof material. Suitable means such as the spools 62 and 78 are provided for storing and for automatically deploying the link 30 after release of the sensor 28 from the fish 20. A suitable link 30 is manufactured by the Sippican Corporation of Marion, Massachusetts, is approximately 0.008 inches (0.20 mm), plus or minus, in diameter and is supplied with either two or three nontwisted, parallel, copper wire conductors coated with an insulating, waterproof epoxy/nylon material. Sippican supplies these links wrapped on spools such as the spools 62 and 78 in desired lengths up to 60,000 feet. The link 30 unreels from each spool 62 and 78 in a direction parallel to its central longitudinal axis. An opening 64a is provided at the extreme rear of the shell 64 (top of shell 64 as viewed in FIG. 3) for dispensing the portion of the line 30 stored on the first spool 62. The inner surface of that portion of the shell 64 which surrounds the first spool 62 is smoothed so as to permit unrestricted unreeling of the link 30 without damage. Also, that inner surface is flared at the extreme rear of the sensor 28 in the vicinity of the the hole 64a to prevent the link 30 from being drawn across a sharp edge which may sever it. The extremely light weight of the Sippican link and the ease with which it unreels from its spools 62 and 78 causes the link to deploy automatically from either spool 62 or spool 78 so long as either the sensor 28 or cartridge 56, respectively, continues to move through the water. As the thin wire link 30 can be expected to break under a very light tensile load (the Sippican link has a rated tensile strength of approximately 200 grams minimum) it is suggested that a sufficient length of the link 30 be provided on the first spool 62 to unreel as the sensor 28 drops from the fish 20. A few hundred feet of link 30 will suffice if the sensor is dropped within 100 feet of the seafloor as suggested. Longer lengths are required for higher drops. The remaining length of the link 30 is stored on the spool 78, which remains in the cartridge 56 and fish 20 after the sensor 28 is released, and unreels as the fish 20 is towed away from the sensor release point. It is expected that the thin wire link 30 will continue to unreel from the cartridge spool 78 until completely deployed at which time the link 30 will break. The deployed link 30 and sensor 28 are then abandoned on the seafloor. The system allows the sensors 28 to be deployed and data gathered from them via the links 30 while the towing vessel is underway.

Information published by Sippican indicates that the magnitude of the capacitance between the conductors of its thin wire link 30, and between each conductor and sea water varies approximately thirteen fold, the rated capacitances being approximately 0.04 μfarad between a cable conductor and sea water and approximately 0.003 μfarad between cable conductors for a network equivalent circuit of a one hundred foot length of its two conductor cable. Consequently, the frequency response of the Sippican link also varies as the proportion of the link in air and sea water or which is exposed to sea water is varied. Accordingly, it is an important feature of the invention to fully immerse the transmission link 30 as is accomplished by locating the link 30 in the sensor 28 and fish 20 to reduce the change in frequency response of the link 30 as it is deployed. The fish 20 is not sealed and so rapidly fills with sea water. The outer case of the cartridge 56 is provided with a multiplicity of holes 79 above the second spool 78 (FIG. 3) to allow the cartridge 56 to flood when the fish 20 is submerged. The free end of the link 30 on the spool 78 is passed through the top of the cartridge 56 for connection to the heavier, reusable, waterproof wires 48 extending from the multipin plug 44. As the connection between the end of the thin wire link 30 and heavier wires 48 must be waterproof to prevent the loss of the sensor signal from electrolytic action of the sea water, suitable connecting means such as push/pull waterproof connectors 80 are provided at the ends of the heavier wires 48 and ends of the conductors of the wire link 30 on the spool 78. The connectors 80 at the end of the thin wire link 30 are held in place at the top of the cartridge 56 by suitable means such as a layer 82 of silicone which allows the connectors 80 to be easily removed from the cartridge 56 for reuse. It is envisioned that the instrument package 60 previously described will provide frequency data in the range of approximately five to one-hundred and twenty-five hertz when used with a twenty thousand foot Sippican thin wire link.

Figure 5:
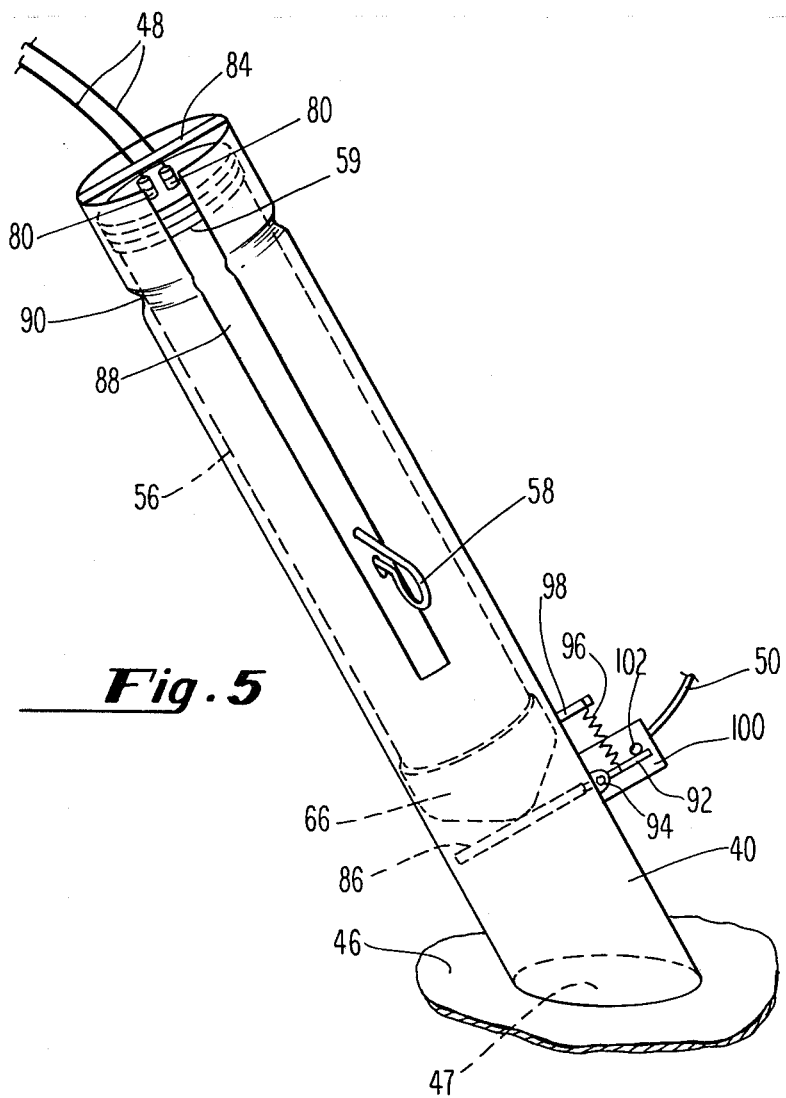
FIG. 5 is a partially sectioned view of a typical sensor launch tube in the towable platform.

A more detailed, partially sectional sideview of a sensor launch tube 40 as is mounted in the fish 20, is depicted in FIG. 5. The tube 40 is positioned in the fish 20 above its lower surface 46 by any suitable means. The top of the tube 40 is open to accept a cartridge 56. The tube 40 has been provided with a slot 88 parallel to its central longitudinal axis to allow the entry of a cartridge 56 with a protruding retaining pin 58. A cartridge 56 is lowered into the tube 40 until its downward progress is checked by a suitable releasable restraining means. Once positioned against the restraining means, the retaining pin 58 is removed. The slot 88 also allows water to flood from the interior of the fish 20 into the tube 40 and cartridge 56. An inwardly raised ring 90 or similar inwardly projecting surfaces are provided along the inner surface of the tube to interact with the lip 59 of the cartridge 56, thus limiting the downward movement of the cartridge 56 in the tube 40. Suitable means such as a removable elastic strap 84 are provided across the top of the tube 40 to complete the restraint of the cartridge 56 within. The heavier wires 48 are connected to the conductor ends of the thin wire link 30 extending through the top end of the cartridge 56 via the push-/pull waterproof connectors 80.

Releasable restraint of the sensor 28 in the tube 40 can be accomplished in several ways using a variety of components. One such means for releasably restraining the sensor is depicted in FIG. 5. A plate 86 extends across and partially covers the cross-section of the tube 40. The plate 86 is perforated or otherwise formed to only partially cover the entire cross-sectional area of the tube 40 so as to allow water to flood the interior of the cartridge 56. The cartridge 56 is lowered into the tube 40 until the nose 66 of the sensor rests on the plate 86. A tongue 92 at the edge of the plate 86 extends through the side wall of the tube 40. The plate 86 is attached to the tube 40 by means of a pivot 94 on the outer surface of the tube 40. Tension is applied to the free end of the tongue 92 by suitable means such as a tension spring 96 extending from an attachment point 98. A releasing mechanism comprising a linear acting solenoid 100 having a retractable pin 102 is also affixed by suitable means along the side wall of the tube 40 so that the pin 102, which is originally extended, rests against the edge of the tongue 92 preventing the plate 86 from pivoting under the tension of the spring 96 and the weight of the cartridge 56 when the latter is dropped into the tube 40. A waterproofed electrical connection 50 is provided from the multipin plug 44 to the solinoid 100 so as to allow the control of its activation from the surface vessel 10. When the solinoid 100 is activated, it retracts the pin 102 allowing the tongue 92 to pivot upwardly and the plate 86 to pivot downwardly under the weight of the sensor and tension of the spring 96. Plate 86 is suitably shaped to be essentially flush against the inner surface of the tube 40 when pivoted under the tension of the spring 96 so as not to interfere with the deployment of the thin wire link 30 from the fish 20 after release of the sensor 28. The sensor separates from the cartridge 56, drops down the tube 40 and through the opening 47 provided in the lower surface 46 of the fish 20. Once released, the sensor 28 drops to the seafloor 11 and transmits a signal back to the fish 20 through the thin wire link 30 until the link 30 breaks.

It is envisioned that the described system can be used in a variety of ways. For example, sensors can be deployed in place of sonobuoys or at intervals between sonobuoys to provide continuous coverage for shallower geophysical formations. Also, the sensors do not have to be deployed along a straight track, as it is envisioned that zig-zag, L-shaped and other tracks can be used to deploy the sensors in two-dimensional arrays. Although it has been suggested to provide a length of thin wire link in both the sensor and fish for deployment from each, it is envisioned that suitably strong thin wire links may be developed that allow the use of a single reservoir or spool in the fish or sensor. Suitable means such as a timing device may be installed in the fish 20 to automatically actuate the release of the sensors 28 in sequence. It is further envisioned that the described system can be used to deploy other types of seafloor sensors such as, for example, pressure or temperature sensors requiring a temporary or short duration communication link with an essentially unchanging frequency response or to deploy on the seafloor with reasonable positional accuracy, other types of small packages with or without trailing hard wire communication links.

It will be apparent that the various elements employed in combination in the practice of the present invention are cappable of variations and changes in the selection and application thereof. In view thereof, it should be understood that the particular embodiments of the invention shown in the drawings and described above are intended to be illustrative only and are not intended to limit the scope of the invention.

I claim:

1. A system for marine seismic survey comprising:
    a submerged towable platform adapted to carry a plurality of releasable seismic sensors;
    means above the water's surface for towing said platform under water and over a submerged area to be seismic surveyed;
    a plurality of seismic sensors carried by said towable platform, eaah sensor comprising a transducer;
    means for separately and sequentially releasing said each of said seismic sensors from said platform by means of an expendable signal transmission cable which breaks away from said platform when fully extended;
    means for transmitting a data signal from each of the released sensors to said towable platform; and
    means for transmitting said sensor data signals from said towable platform to said means for towing.

2. The system described in claim 1 wherein said transducer of said sensor comprises a hydrophone.

3. The system described in claim 1 wherein said transducer of said sensor comprises a geophone.

4. The system described in claim 2 or 3 wherein said sensor further comprises a preamplifier connected to the output of said transducer and a power supply for operation of said preamplifier.

5. The system described in claim 1 wherein said means for transmitting a data signal from each released sensor comprises a small diameter, coated, multiconductor cable between said sensor and said platform which is abandoned after use.

6. The marine seismic survey system of claim 1 wherein said submerged towable platform comprises:
    a housing,
    a plurality of tubes affixed to said housing and having their tops canted in the forward direction of the tow of said platform,
    means for releasably mounting one of said seismic sensors in each of said tubes, and
    means for separately and sequentially releasing said sensor means from said tubes to permit each of said sensors to be dispensed out of said tubes and to enter the water below the platform at an angle at which said tubes are canted in the forward direction of tow, thereby reducing the strain placed on said breakable signal transmission cables as the sensor means enter the water.

7. A method for gathering seismic data from an area submerged under water comprising the steps of:
    towing one or more seismic wave generators through the water;
    towing a seismic streamer cable through the water having a plurality of spaced apart acoustic receivers for receiving seismic reflection signals;
    towing under the surface of the water platform means adapted to carry a plurality of expendable seismic sensor means each having an expendable, multiconductor data transmission cable connected to said platform means;
    controllably releasing said seismic sensor means in sequence to a fixed position in the water while said platform means is being towed under water over the submerged area to be surveyed, whereby the offset of said seismic sensor means from said one or more seismic wave generators continuously increases;

transmitting wide angle seismic reflection signals and seismic refraction signals from each of said released sensor means through said transmission line to said submerged platform means when said sensor means has a larger offset distance from said one or more seismic wave generators than said acoustic receivers on said seismic streamer cable;

transmitting said wide angle seismic reflection signals and said seismic refraction signals from the released sensor to the water's surface from said submerged platform means; and expending each of said released sensor means in sequence as the expendable transmission cable connecting said released sensor means to said platform means is fully extended, whereby a marine seismic survey includes normally recorded seismic reflection signals, wide angle seismic reflection signals, and seismic refraction signals during a continuous traverse through the water.

8. The method of claim 7 wherein said sensor means is expended by the breaking of the expendable transmission cable from the platform means when it is fully extended.

* * * * *